United States Patent [19]

Whittenberger

[11] Patent Number: 4,753,919

[45] Date of Patent: Jun. 28, 1988

[54] METHOD FOR OPTIMIZING STACKING CHARACTERISTICS OF CORRUGATED METAL FOIL

[75] Inventor: William A. Whittenberger, Garretsville, Ohio

[73] Assignee: W. R. Grace & Co., New York, N.Y.

[21] Appl. No.: 28,749

[22] Filed: Mar. 23, 1987

[51] Int. Cl.⁴ .............................................. B01J 32/00
[52] U.S. Cl. ..................................... 502/439; 502/527
[58] Field of Search ................................ 502/439, 527

[56] References Cited

U.S. PATENT DOCUMENTS 4,271,044  6/1981  Fratzer et al. .................. 502/527 X
4,673,553  6/1987  Retallick ......................... 502/527 X

FOREIGN PATENT DOCUMENTS 2815317  10/1979  Fed. Rep. of Germany ...... 502/527

*Primary Examiner*—W. J. Shine
*Attorney, Agent, or Firm*—Steven T. Trinker

[57] ABSTRACT

There is provided a method for optimizing the stacking characteristics of a thin metal foil corrugated in a chevron pattern and folded in an accordion fashion or zig-zag manner to form a stack useful as a catalyst support member for catalytic converters for treating exhaust gases from internal combustion engines. This method provides a more stable and stronger stack.

2 Claims, 1 Drawing Sheet

FIG.1
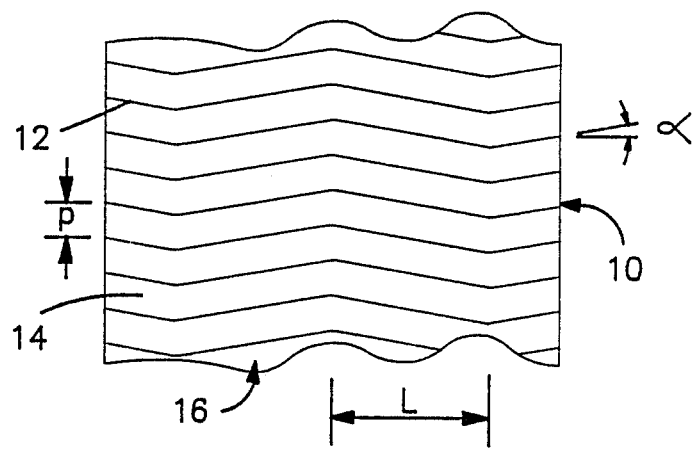
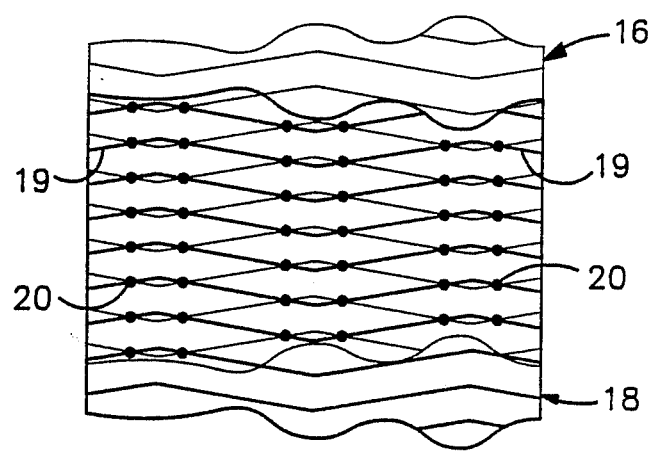
FIG.2

METHOD FOR OPTIMIZING STACKING CHARACTERISTICS OF CORRUGATED METAL FOIL

This invention relates, as indicated, to a method for optimizing the stacking characteristics of metal foil corrugated in a chevron pattern and folded in an accordion fashion or zig-zag manner to form a stack. Stacks of this type are used as catalyst support elements in catalytic converters which are primarily useful in removing pollutants from exhaust from internal combustion engines of either the spark ignited or the compression ignited types. Optimal stacking characteristics are desirable because they lead to the production of a more stable and stronger stack.

BACKGROUND OF THE INVENTION

Recently there have been several developments in the field of metal foil supported catalytic media. An early development in metallic carriers for catalysts is described in U.S. Pat. No. 1,636,685 dated 26 July 1927 to Downs. Here metallic (iron) particles are treated by dipping into melted aluminum. An alloying action takes place between the aluminum and iron. The resulting surface is very satisfactory for the deposition of catalytic materials such as a metal of Group V or Group VI of the Periodic Table. Such structures are adapted for vapor phase catalytic oxidation of organic compounds.

U.S. Pat. No. 2,658,742, dated 10 Nov. 1953, to Suter et al discloses a metallic catalyst support for removing harmful ingredients from exhaust streams. Platinum and palladium are disclosed as useful to aid in oxidation of combustible materials, e.g., carbon monoxide. Stainless steel is disclosed as a base metal for the catalyst.

Bernstein et al U.S. Pat. No. 3,773,894 disclose a metallic catalyst supported on a metallic substrate as a catalytic converter for internal combustion engine exhaust gases. Various physical forms of the catalyst support are shown including spiral wound screen and cordierite honeycomb.

The U.S. patent to Retallick No. 4,301,039, dated 17 Nov. 1981, discloses a method of making a metallic catalyst support in a spirally wound form whereby indentations in the surface of the metal foil will not nest together.

U.S. Pat. No. 4,318,888, dated 9 Mar. 1982, to Chapman et al discloses a spirally wound foil structure having a corrugated surface and distinct different catalysts supported on confronting surfaces.

U.S. Pat. No. 4,402,871 to Retallick, dated 6 Sept. 1983, discloses a honeycomb catalyst support formed by folding a single layer of metal foil back and forth upon itself in an accordion or zig-zag fashion. Each layer in the honeycomb has indentations of uniform height so that the spacing between layers is equal to this height. A different pattern of indentations is used on alternate layers and the indentations are on opposite sides of the strip in alternate layers. This structure prevents nesting of confronting layers.

More recent structures are made of a thin ferritic stainless steel of the type referred to by Kilbane in patent application Ser. No. 741,282, filed 4 June 1985, now U.S. Pat. No. 4,686,155, and by Retallick in application Ser. No. 738,485, filed 28 May 1985, now U.S. Pat. No. 4,601,999, corrugated and fan folded or folded back and forth upon itself. The surface of the strip is provided with a catalytically active agent for decontaminating an exhaust gas, e.g., the exhaust gas generated by an internal combustion engine. Reference may also be had to Cornelison patent application Ser. No. 796,710, filed 12 Nov. 1985, now U.S. Pat. No. 4,725,411, which discloses a catalytically active fan folded element of the type which can be produced by the process disclosed in the application of Cornelison and Retallick, Ser. No. 830,698, filed 18 Feb. 1986, now U.S. Pat. No. 4,711,009.

Thus, it will be seen that the general type of catalyst support element to which the present invention relates is generally well known. It has now been found that there is a special relationship between the parameters defining the corrugated surface that when observed provides a stack of corrugated foil which is uniform and has no weak areas.

BRIEF STATEMENT OF THE INVENTION

Briefly stated, therefore, the present invention is in a method for optimizing the number of contact points, n, between confronting surfaces of an accordion folded metal foil corrugated in a chevron pattern which comprises dimensioning the pitch of the chevrons, p, and the angle of the chevron, alpha, and determining L, which is the length of each chevron from apex to apex, by the equation:

$$L = \frac{(n + 0.25)p}{2 \tan(\alpha)}, \text{ where } n = 1, 2, 3 \ldots$$

In the preferred cases, n is 3 or less.

BRIEF DESCRIPTION OF THE DRAWINGS

The invention may be better understood by having reference to the annexed drawings wherein:

FIG. 1 is a fragmentary plan drawing showing a section of the surface of a corrugated metal foil.

FIG. 2 is a fragmentary plan drawing showing first and second layers in superimposed relation and showing the contact points between the peaks of the corrugations of the confronting surfaces.

DETAILED DESCRIPTION OF THE INVENTION

As above indicated, this invention concerns a method for optimizing the stacking characteristics of a metal foil corrugated in a chevron pattern. Optimal stacking characteristics lead to a more stable and therefore stronger stack of such foil when used in catalytic converters and similar applications, e.g., conducting catalyzed chemical reactions such as hydrogenation of an oil.

FIG. 1 shows a typical corrugated foil 10. Lines 12 are peaks and spaces 14 represent valleys defining a corrugated surface such as is well known in the art. As shown in the drawing key parameters are identified as "p" which is the pitch or distance between peaks 12 in the indicated "length direction"; alpha is the chevron angle; 2L is the chevron pitch in a direction transversely of the metal strip 16.

FIG. 2 is a fragmentary plan view with the first and second layers in superimposed relation, the first layer being depicted as visible through the second layer, and showing the contact points between the corrugations in confronting relation. Thus, there is shown the first corrugated strip 16 of FIG. 1, having superimposed thereover in contacting relation therewith an overfolded portion 18 of the same corrugated strip 10 (FIG. 1). When the strip portions 16 and 18 are in contacting relation, the peaks 12 of the strip portion 16 (FIG. 1) intersect and contact the peaks 19 at the points 20 in a pattern as shown in FIG. 2.

As one layer 16 or 18 is shifted longitudinally in the direction of length (FIG. 1) relative to the other layer 18 or 16, as the case may be, through a distance equivalent to "p", the actual number of contact points 20 will vary. The statistical average number of points in contact per square inch is given by the equation:

$$\text{ave.pts./in}^2 = 2 \tan(\text{alpha})p^2$$

where "p" is in inches.

Depending upon the relationship among p, L and alpha, and how one layer 16 or 18 is shifted relative to the next layer, e.g., 18 or 16, the actual number of points in contact can be much more or much less than the average. The minimum possible number of points 20 in contact per square inch is given by the equation:

$$\text{min pts/in}^2 = \frac{int(2L\tan(\text{alpha})/p)}{Lp}$$

where int represents the operation that gives the largest integer less than or equal to the operand.

When L, p, and alpha are chosen such that the minimum number of contact points 20 is close to the average, then the stacking characteristics are optimized. Optimized accordion folded stacks are uniform and have no weak areas.

In practice, p is generally affected by performance characteristics other than stacking. In such case, one selects alpha to obtain a reasonable number of average contact points 20 per square inch, using the equation:

$$L = \frac{np}{2 \tan(\text{alpha})}, \text{ where } n = 1, 2, 3 \ldots$$

It is seen, therefore, that many values of L optimize the stacking characteristics. The minimum number of points 20 in contact can now be expressed by the equation:

$$\text{min pts/in}^2 = \frac{int(n)}{n} \times \frac{2 \tan(\text{alpha})}{p^2} = \frac{int(n) \times \text{ave. pts./in}^2}{n}$$

When n is indeed an integer, the minimum number of points 20 in contact is equal to the average number of points 20 in contact, and stacking is optimized.

If L is selected to correspond to n=2, stacking is optimized as long as p and alpha are constant. If p becomes slightly larger or alpha slightly smaller, the minimum number of points 20 in contact is cut approximately in half. If p becomes slightly smaller or alpha slightly larger, no such drastic effect is observed. Therefore, when p or alpha are uncertain, L should be selected to be slightly larger than the calculated value so that catastrophic effects are eliminated, e.g., when the minimum contacts per in² are about one half the average number of contact points 20 per in².

It should be noted that the effect is not catastrophic when n is large. Unfortunately, considerations other than stacking usually dictate that L be small, which causes n to be in the preferred cases, 3 or less.

Accordingly, it has been found that the following equation, while it sacrifices some optimization, it eliminates catastrophic effects in most practical applications:

$$L = \frac{(n + 0.25)p}{2 \tan(\text{alpha})}, n = 1, 2, 3 \ldots$$

The following Tables shows the conditions for optimal stacking, modified stacking and "catastrophic" effect.

TABLE 1

OPTIMAL STACKING

MODEL FOR NEW CORRUGATOR
290–400 cells (nominal 320)

| | Foil thickness | 0.0030 | |
|---|---|---|---|
| | For gear clearance | 0.0050 | |
| | | Gear with Clearance | Gear with Material |
| Normal diametral pitch | | 42 | |
| Normal press, angle | | 20.0 | |
| Helix angle | | alpha = 6.0 | |
| Hob full depth | | 2.25/NDP | |
| Transverse diam. pitch | | 41.77 | |
| Transverse press. angle | | 20.10 | |
| Trans. p.a., radians | | 0.350835 | |
| Cosine, trans. p.a. | | 0.939086 | |
| Tangent, trans. p.a. | | 0.365975 | |
| Circular pitch | | 0.075212 | |
| Base pitch | | 0.070630 | |
| No. of teeth | | 28 | |
| Addendum factor | | 1.420/NDP | |
| Dedendum factor | | 0.830/NDP | |
| Addendum | | 0.033810 | |
| Pitch diameter | | 0.670339 | |
| Outside diameter | | 0.737958 | |
| Base diameter | | 0.629506 | |
| Hob offset | | 0.010000 | |
| Blank diameter | | 0.7450 | |
| Blank length | | L = 0.7755 | |
| Overlap factor | | 1.0001 | |
| P.A. at blank dia. (rad) | | 0.564279 | |
| Tooth thickness at P.D. | | 0.044925 | |
| Tooth thickness at B.D. | | 0.051720 | |
| Land thickness | | 0.010066 | |
| Minimum pitch diameter | | 0.689429 | 0.684429 |

TABLE 1-continued
OPTIMAL STACKING

|  |  |  |  |  |
|---|---|---|---|---|
| Equiv. pitch diameter | 0.705280 | 0.705280 |  |  |
| (Iteration check) | 1.000007 |  |  |  |
|  | CASE I | CASE II | CASE III | CASE IV |
| Corrugation height | 0.045720 | 0.42000 | 0.038000 | 0.030000 |
| Expected correg. length | 0.79132 | 0.079550 | 0.079998 | 0.080896 |
| Stretch factor | 1.0300 | 1.0300 | 1.0300 | 1.0300 |
| Actual corrug. length | P = 0.081506 | 0.081936 | 0.082398 | 0.083323 |
| Height to length | 0.560939 | 0.512595 | 0.461174 | 0.360045 |
| Cells per sq. inch | 268.4 | 290.6 | 319.4 | 400.1 |
| Ave. contacts per in$^2$ | 31.6424 | 31.3112 | 30.9609 | 30.2776 |
| Min. contacts per in$^2$ | 31.6415 | 31.4755 | 31.2989 | 30.9517 |

TABLE 2
CATASTROPHIC EFFECT

MODEL FOR NEW CORRUGATOR
290–400 cells (nominal 320)

|  |  |  |  |  |
|---|---|---|---|---|
| Foil thickness | 0.0030 |  |  |  |
| Form gear clearance | 0.0080 |  |  |  |
|  | Gear with Clearance | Gear with Material |  |  |
| Normal diametral pitch | 42 |  |  |  |
| Normal press, angle | 20.0 |  |  |  |
| Helix angle | alpha = 6.0 |  |  |  |
| Hob full depth | 2.25/NDP |  |  |  |
| Transversed diam. pitch | 41.77 |  |  |  |
| Transverse press. angle | 20.10 |  |  |  |
| Trans. p.a., radians | 0.350835 |  |  |  |
| Cosine, trans. p.a. | 0.939086 |  |  |  |
| Tangent, trans. p.a. | 0.365975 |  |  |  |
| Circular pitch | 0.075212 |  |  |  |
| Base pitch | 0.070630 |  |  |  |
| No. of teeth | 28 |  |  |  |
| Addendum factor | 1.420/NDP |  |  |  |
| Dedendum factor | 0.830/NDP |  |  |  |
| Addendum | 0.033810 |  |  |  |
| Pitch diameter | 0.670339 |  |  |  |
| Outside diameter | 0.737958 |  |  |  |
| Base diameter | 0.629506 |  |  |  |
| Hob offset | 0.010000 |  |  |  |
| Blank diameter | 0.7450 |  |  |  |
| Blank length | L = 0.7750 |  |  |  |
| Overlap factor | 1.0001 |  |  |  |
| P.A. at blank dia. (rad) | 0.564279 |  |  |  |
| Tooth thickness at P.D. | 0.044925 |  |  |  |
| Tooth thickness at B.D. | 0.051720 |  |  |  |
| Land thickness | 0.010066 |  |  |  |
| Minimum pitch diameter | 0.689429 | 0.684429 |  |  |
| Equiv. pitch diameter | 0.705280 | 0.705280 |  |  |
| (Iteration check) | 1.000007 |  |  |  |
|  | CASE V | CASE VI | CASE VII | CASE VIII |
| Corrugation height | 0.045720 | 0.42000 | 0.038000 | 0.030000 |
| Expected correg. length | 0.79132 | 0.079550 | 0.079998 | 0.080896 |
| Stretch factor | 1.0300 | 1.0300 | 1.0300 | 1.0300 |
| Actual correg. length | P = 0.081506 | 0.081936 | 0.082398 | 0.083323 |
| Height to length | 0.560939 | 0.512595 | 0.461174 | 0.360045 |
| Cells per sq. inch | 268.4 | 290.6 | 319.4 | 400.1 |
| Ave. contacts per in$^2$ | 31.6424 | 31.3112 | 30.9609 | 30.2776 |
| Min. contacts per in$^2$ | 15.8310 | 15.7479 | 15.6596 | 15.4858 |

TABLE 3
MODIFIED STACKING

MODEL FOR NEW CORRUGATOR
290–400 cells (nominal 320)

|  |  |  |
|---|---|---|
| Foil thickness | 0.0030 |  |
| Form gear clearance | 0.0080 |  |
|  | Gear with Clearance | Gear with Material |
| Normal diametral pitch | 42 |  |
| Normal press, angle | 20.0 |  |
| Helix angle | alpha = 6.0 |  |
| Hob full depth | 2.25/NDP |  |
| Transverse diam. pitch | 41.77 |  |
| Transverse press. angle | 20.10 |  |
| Trans. p.a., radians | 0.350835 |  |

TABLE 3-continued
MODIFIED STACKING

| | | | | |
|---|---|---|---|---|
| Cosine, trans. p.a. | 0.939086 | | | |
| Tangent, trans. p.a. | 0.365975 | | | |
| Circular pitch | 0.075212 | | | |
| Base pitch | 0.070630 | | | |
| No. of teeth | 28 | | | |
| Addendum factor | 1.420/NDP | | | |
| Dedendum factor | 0.830/NDP | | | |
| Addendum | 0.033810 | | | |
| Pitch diameter | 0.670339 | | | |
| Outside diameter | 0.737958 | | | |
| Base diameter | 0.629506 | | | |
| Hob offset | 0.010000 | | | |
| Blank diameter | 0.7450 | | | |
| Blank length | L = 0.8750 | | | |
| Overlap factor | 1.2567 | | | |
| P.A. at blank dia. (rad) | 0.564279 | | | |
| Tooth thickness at P.D. | 0.044925 | | | |
| Tooth thickness at B.D. | 0.051720 | | | |
| Land thickness | 0.010066 | | | |
| Minimum pitch diameter | 0.689429 | 0.684429 | | |
| Equiv. pitch diameter | 0.705280 | 0.705280 | | |
| (Iteration check) | 1.000007 | | | |
| | CASE IX | CASE X | CASE XI | CASE XII |
| Corrugation height | 0.045720 | 0.42000 | 0.038000 | 0.030000 |
| Expected corrug. length | 0.79132 | 0.079550 | 0.079998 | 0.080896 |
| Stretch factor | 1.0300 | 1.0300 | 1.0300 | 1.0300 |
| Actual correg. length | P = 0.081506 | 0.081936 | 0.082398 | 0.083323 |
| Height to length | 0.560939 | 0.512595 | 0.461174 | 0.360045 |
| Cells per sq. inch | 268.4 | 290.6 | 319.4 | 400.1 |
| Ave. contacts per in$^2$ | 31.6424 | 31.3112 | 30.9609 | 30.2776 |
| Min. contacts per in$^2$ | 28.0434 | 27.8963 | 27.7398 | 27.4320 |

In the best mode of carrying out my invention, I have determined that for best results alpha is from 6° to 7°, p is about 0.080" up to 0.125", L is 0.75" to about 2" and the thickness of the foil is 0.003". The conditions of Cases IX thru XII in the above Table III are the most satisfactory all things considered.

What is claimed is:

1. A method for optimizing the number of contact points, n, between confronting surfaces of metal foil corrugated in a chevron pattern and folded in an accordian fashion to form a stack useful as a catalyst support element which comprises dimensioning the pitch of the chevrons, p, and the angle of the chevrons, alpha, and determining L, which is the length of each chevron from apex to apex, from the equation:

$$L = \frac{(n + 0.25)p}{2 \tangent (alpha)} \quad n = 1, 2, 3 \text{ or more} \ldots$$

2. A method as defined in claim 1 wherein n is 3 or less.

* * * * *